US008833162B2

(12) United States Patent
Seeger et al.

(10) Patent No.: US 8,833,162 B2
(45) Date of Patent: Sep. 16, 2014

(54) MICROMACHINED GYROSCOPE INCLUDING A GUIDED MASS SYSTEM

(75) Inventors: Joseph Seeger, Menlo Park, CA (US); Ozan Anac, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 405 days.

(21) Appl. No.: 13/235,296

(22) Filed: Sep. 16, 2011

(65) Prior Publication Data

US 2013/0068018 A1 Mar. 21, 2013

(51) Int. Cl.
| G01C 19/56 | (2012.01) |
| G01C 19/574 | (2012.01) |
| G01C 19/5755 | (2012.01) |

(52) U.S. Cl.
CPC .......... *G01C 19/574* (2013.01); *G01C 19/5755* (2013.01)
USPC .......................................... 73/504.12; 73/510

(58) Field of Classification Search
USPC ............... 73/504.02, 504.04, 504.12, 504.14, 73/510, 511
See application file for complete search history.

(56) References Cited

U.S. PATENT DOCUMENTS

| | | | | |
|---|---|---|---|---|
| 4,510,802 | A | | 4/1985 | Peters |
| 5,481,914 | A | * | 1/1996 | Ward ........................ 73/504.16 |
| 5,895,850 | A | * | 4/1999 | Buestgens ................. 73/504.12 |
| 5,992,233 | A | * | 11/1999 | Clark ........................ 73/514.35 |
| 6,067,858 | A | * | 5/2000 | Clark et al. ............... 73/504.16 |
| 6,230,563 | B1 | * | 5/2001 | Clark et al. ............... 73/504.04 |
| 6,250,156 | B1 | * | 6/2001 | Seshia et al. ............. 73/504.12 |
| 6,508,122 | B1 | * | 1/2003 | McCall et al. ............ 73/504.12 |
| 6,520,017 | B1 | * | 2/2003 | Schoefthaler et al. ..... 73/514.02 |
| 6,845,669 | B2 | * | 1/2005 | Acar et al. ................ 73/504.14 |
| 6,892,575 | B2 | * | 5/2005 | Nasiri et al. .............. 73/504.12 |
| 6,939,473 | B2 | * | 9/2005 | Nasiri et al. ...................... 216/2 |
| 7,036,372 | B2 | * | 5/2006 | Chojnacki et al. ......... 73/504.12 |
| 7,250,112 | B2 | * | 7/2007 | Nasiri et al. ...................... 216/2 |
| 7,284,430 | B2 | * | 10/2007 | Acar et al. ................ 73/504.12 |
| 7,437,933 | B2 | * | 10/2008 | Durante et al. ............ 73/504.15 |
| 7,458,263 | B2 | * | 12/2008 | Nasiri et al. .............. 73/504.12 |
| 8,042,394 | B2 | * | 10/2011 | Coronato et al. .......... 73/504.04 |
| 8,042,396 | B2 | * | 10/2011 | Coronato et al. .......... 73/504.12 |
| 8,069,726 | B2 | * | 12/2011 | Seeger et al. ............. 73/504.12 |
| 8,141,424 | B2 | * | 3/2012 | Seeger et al. ............. 73/504.12 |
| 8,322,213 | B2 | * | 12/2012 | Trusov et al. ............. 73/504.12 |
| 8,539,835 | B2 | * | 9/2013 | Seeger et al. ............. 73/504.12 |
| 2004/0211258 | A1 | | 10/2004 | Geen |
| 2005/0066728 | A1 | * | 3/2005 | Chojnacki et al. ......... 73/514.16 |
| 2005/0072231 | A1 | * | 4/2005 | Chojnacki et al. ......... 73/504.14 |
| 2005/0081631 | A1 | | 4/2005 | Weinberg et al. |
| 2005/0081633 | A1 | * | 4/2005 | Nasiri et al. .............. 73/514.29 |

(Continued)

*Primary Examiner* — Peter Macchiarolo
*Assistant Examiner* — Samir M Shah
(74) *Attorney, Agent, or Firm* — Sawyer Law Group, P.C.

(57) ABSTRACT

A gyroscope is disclosed. The gyroscope comprises a substrate; and a guided mass system. The guided mass system comprises proof-mass and guiding arm. The proof-mass and the guiding arm are disposed in a plane parallel to the substrate. The proof-mass is coupled to the guiding arm. The guiding arm is also coupled to the substrate through a spring. The guiding arm allows motion of the proof-mass to a first direction in the plane. The guiding arm and the proof-mass rotate about a first sense axis. The first sense axis is in the plane and parallel to the first direction. The gyroscope includes an actuator for vibrating the proof-mass in the first direction. The gyroscope also includes a transducer for sensing motion of the proof-mass-normal to the plane in response to angular velocity about a first input axis that is in the plane and orthogonal to the first direction.

12 Claims, 18 Drawing Sheets

(56) References Cited

U.S. PATENT DOCUMENTS

| | | | |
|---|---|---|---|
| 2005/0199061 A1* | 9/2005 | Acar et al. | 73/504.02 |
| 2006/0070441 A1* | 4/2006 | Durante et al. | 73/504.12 |
| 2006/0219006 A1* | 10/2006 | Nasiri et al. | 73/504.12 |
| 2007/0214883 A1* | 9/2007 | Durante et al. | 73/504.04 |
| 2007/0240508 A1* | 10/2007 | Watson | 73/504.12 |
| 2008/0115579 A1* | 5/2008 | Seeger et al. | 73/504.12 |
| 2009/0064780 A1* | 3/2009 | Coronato et al. | 73/504.08 |
| 2009/0114016 A1* | 5/2009 | Nasiri et al. | 73/504.12 |
| 2009/0260437 A1 | 10/2009 | Blomqvist | |
| 2010/0071467 A1 | 3/2010 | Nasiri et al. | |
| 2010/0222998 A1 | 9/2010 | Blomqvist | |
| 2011/0061460 A1* | 3/2011 | Seeger et al. | 73/504.12 |

* cited by examiner

800

MICROMACHINED GYROSCOPE INCLUDING A GUIDED MASS SYSTEM

FIELD OF THE INVENTION

The present invention relates generally to angular velocity sensors and more particularly relates to angular velocity sensors that include guided mass systems.

BACKGROUND OF THE INVENTION

Sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

Frequently, a mass, usually referred to as a proof mass, within the sensor is driven into oscillation by an actuator. Rotation of the sensor imparts a Coriolis force to the oscillating mass that is proportional to the angular velocity (or rotation rate), and depends on the orientation of the angular velocity vector with respect to the velocity vector of the proof mass. The Coriolis force, the angular velocity vector, and the proof-mass velocity vector are mutually orthogonal. For example, a proof-mass moving in an X-direction within a sensor rotating about a Y-axis experiences a Z directed Coriolis force. Similarly, a proof-mass moving in an X-direction within a sensor rotating about a Z-axis experiences a Y directed Coriolis force. Finally, a proof-mass moving in an X-direction within a sensor rotating about the X-axis experiences no Coriolis force. Coriolis forces imparted to the proof-mass are usually sensed indirectly by measuring motions within the sensor that are responsive to the Coriolis forces.

Conventional gyroscopes that sense angular velocity about an in-plane axis (i.e. X-axis or Y-axis) can be driven out-of-plane, and the Coriolis response is sensed in-plane or vice versa. Out-of-plane drive tends to be less efficient than in-plane drive, requires additional fabrication steps, and is limited by nonlinearities. For example, driving the proof-mass out-of-plane might require a large vertical gap or a cavity underneath the proof-mass to provide sufficient room for the proof-mass to oscillate. Forming a cavity under the proof-mass requires additional fabrication steps and increases cost. Typically electrostatic actuators of the parallel-plate type are used to drive the proof-mass out-of-plane. The actuators are formed between the proof-mass and the substrate. The electrostatic force depends on the gap between the proof-mass and the substrate. Because the proof-mass oscillates out-of-plane, the electrostatic force is nonlinear which tends to limit the device performance. Additionally, the electrostatic force is reduced because of the requirement to have large vertical gaps or a cavity under the proof-mass. Achieving large amplitude oscillation requires large force and that might require high-voltage actuation. Adding high-voltage actuation increases the fabrication cost and complexity of the integrated circuits.

Furthermore a conventional multi-axis gyroscope might use multiple structures that oscillate at independent frequencies to sense angular rates. Each structure requires a separate drive circuit to oscillate the respective proof-masses. Having more than one drive circuit increases cost and power consumption.

Accordingly, what is desired is to provide a system and method that overcomes the above issues. The present invention addresses such a need.

SUMMARY OF THE INVENTION

A gyroscope is disclosed. In one embodiment, the gyroscope comprises a substrate; and a guided mass system. The guided mass system comprises at least one proof-mass and at least one guiding arm. The at least one proof-mass and the at least one guiding arm are disposed in a plane parallel to the substrate. The at least one proof-mass is coupled to the at least one guiding arm.

The at least one guiding arm is also coupled to the substrate through at least one spring. The at least one guiding arm allows for motion of the at least one proof-mass, in a first direction in the plane. The at least one guiding arm and the at least one proof-mass rotate about a first sense axis. The first sense axis is in the plane and parallel to the first direction.

The gyroscope includes an actuator for vibrating the at least one proof-mass in the first direction. The gyroscope also includes a transducer for sensing motion of at least one proof-mass normal to the plane in response to angular velocity about a first input axis that is in the plane and orthogonal to the first direction.

A method and system in accordance with the present invention provides a mechanical structure that oscillates at one frequency and is capable of sensing angular rate about multiple axes. One drive motion requires only one drive circuit, which lowers cost and power. Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The present invention relates generally to angular velocity sensors and more particularly relates to in-plane angular velocity sensors that have at least one proof mass. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention provides a guided mass system as part of a gyroscope that oscillates at one frequency and is capable of sensing angular rate about multiple axes. One drive motion requires only one drive circuit, which lowers cost and power. To describe the features of the present invention in more detail refer now to following description on conjunction with the accompanying Figures.

Figure 1A:
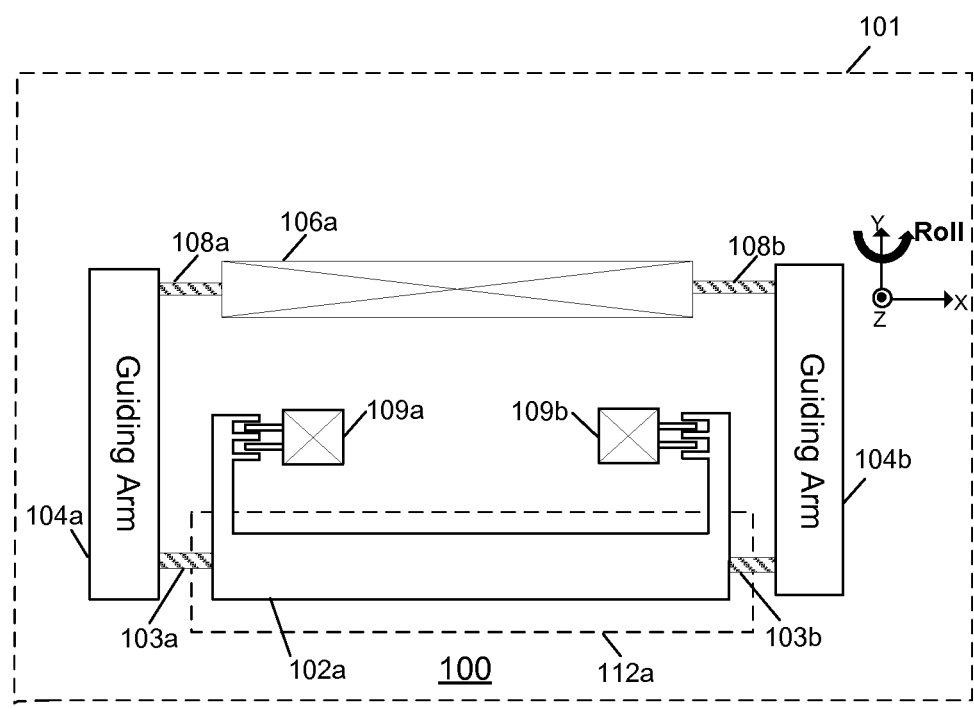
FIGS. 1A-1C illustrate an embodiment of a gyroscope comprising a guided mass system in accordance with the present invention.

FIG. 1A illustrates an embodiment of a gyroscope comprising a guided mass system 100 in accordance with the present invention. The guided mass system 100 is disposed in an X-Y plane parallel to a substrate 101. A Z-direction is normal to the X-Y plane. The guided mass system 100 includes guiding arms 104a and 104b that are flexibly coupled via springs 108a and 108b to the substrate 101 via at least one anchoring point 106a. The two guiding arms 104a and 104b are flexibly coupled to one roll proof-mass102a via springs 103a and 103b.

Figure 1B:
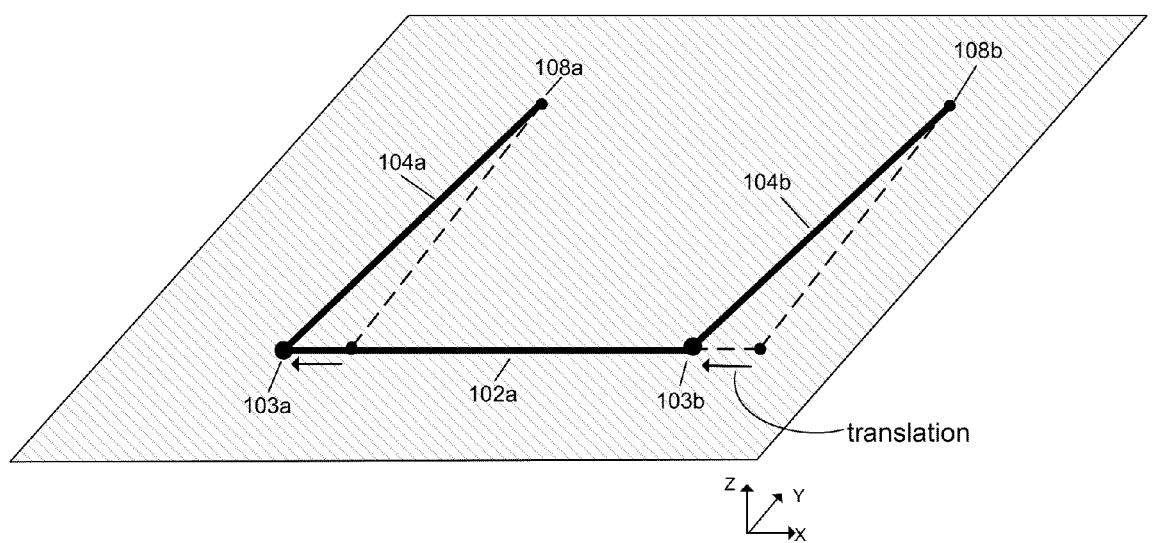

The roll proof-mass 102a, guiding arms 104a and 104b, anchoring point 106a, and springs 103a, 103b, 108a, and 108b form a planar four-bar linkage. Each spring 103a, 103b, 108a, and 108b is compliant in-plane about an axis in the Z-direction so that each guiding arm 104a and 104b can rotate in-plane while the proof-mass102a translates in an X-direction, as shown in FIG. 1B.

Figure 10:
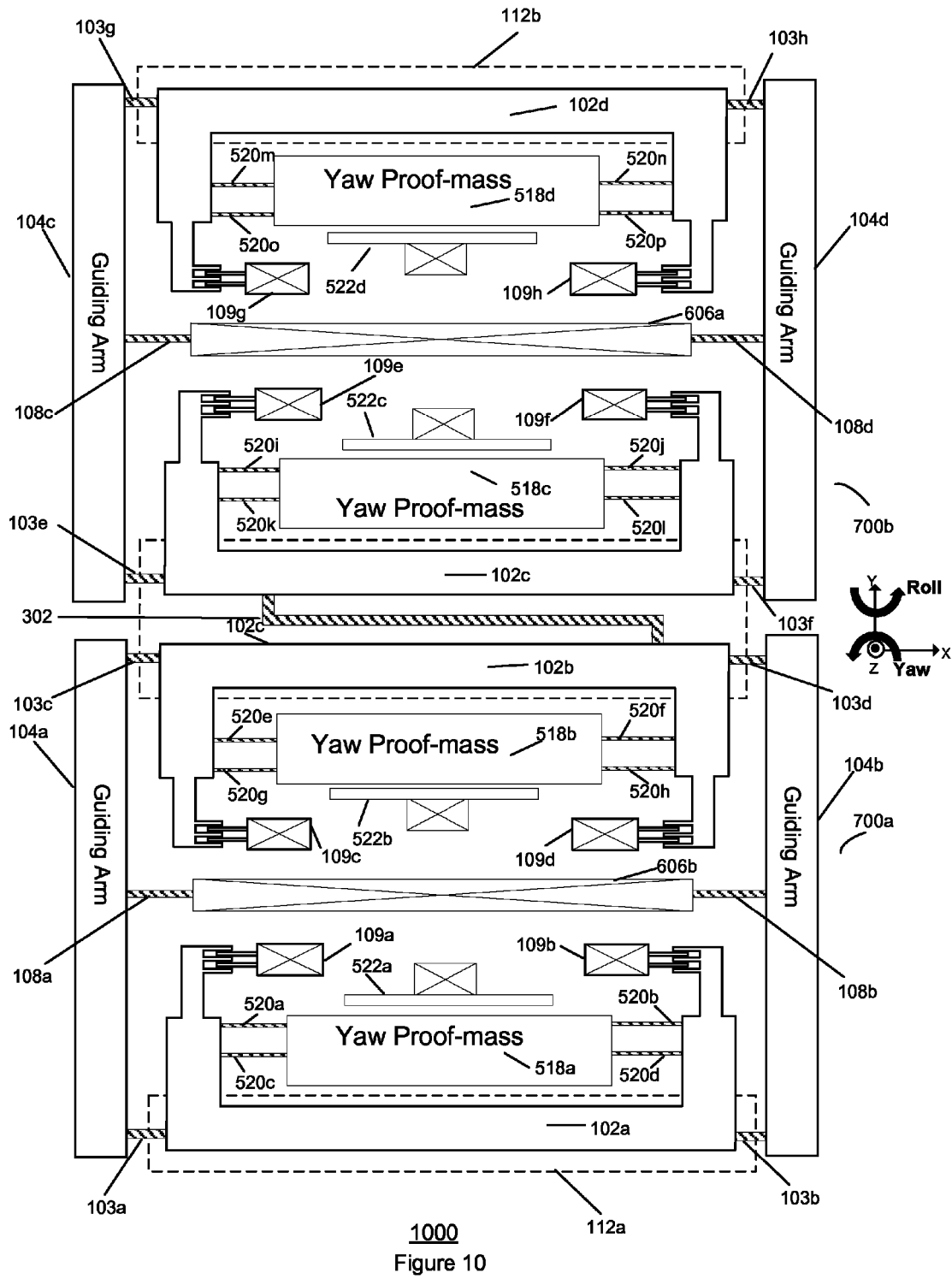
FIG. 10 illustrates a second embodiment of a dual-axis gyroscope comprising a balanced guided mass system in accordance with the present invention.

The springs 108a and 108b are compliant about a first roll-sense axis in the X-direction so that the guiding arms 104a and 104b can rotate out-of-plane. The springs 103a and 103b are stiff in the Z-direction, whereby out-of-plane rotation of the guiding arms 104a and 104b causes the roll proof-mass 102a to move out-of-plane with the guiding arms 104a and 104b, as shown in FIG. 10.

Electrostatic actuators, such as comb drives 109a and 109b, are connected to the roll proof-mass 102a to drive the guided mass system 100. In this embodiment, two electrostatic actuators are utilized. However, one of ordinary skill in the art readily recognizes that one electrostatic actuator can be provided and the use of one electrostatic actuator would be within the spirit and scope of the present invention. In addition, although electrostatic actuators will be described throughout this specification as the actuators being used to drive the guided mass systems one of ordinary skill in the art recognizes that a variety of actuators could be utilized for this function and that use would be within the spirit and scope of the present invention. For example, the actuators could be piezoelectric, thermal or electromagnetic or the like.

Figure 1C:
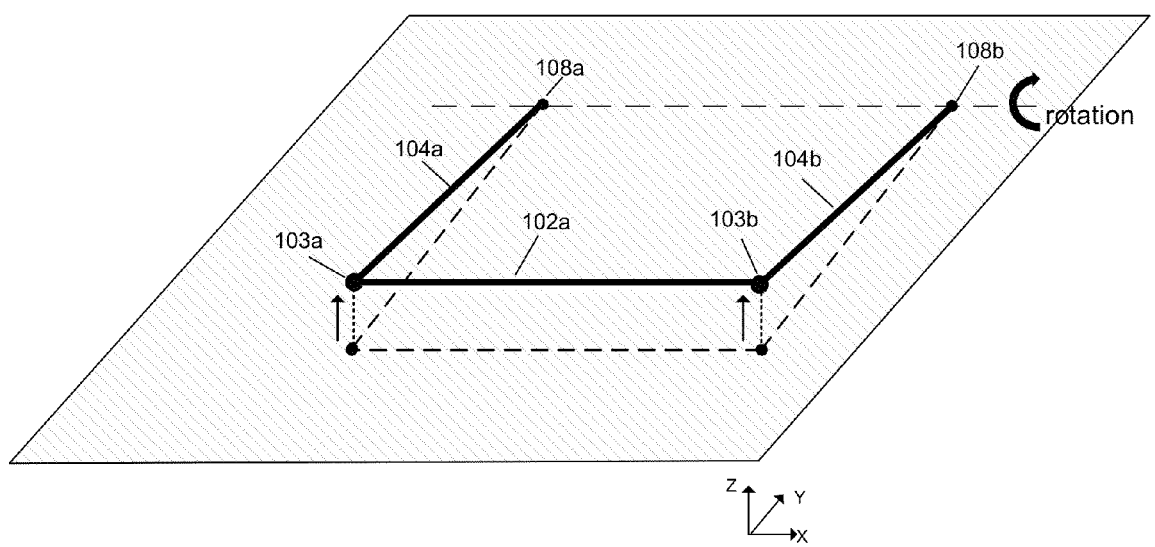

The guided mass system 100 can be driven at a drive frequency by a single drive circuit coupled to the actuators 109a and 109b. The drive frequency can be a resonant frequency of the guided mass system 100. When the guided mass system 100 is driven, the guiding arms 104a and 104b rotate in-plane and the roll proof-mass102a translates in-plane in the X-direction, as shown in FIG. 1B. Angular velocity about a roll-input axis in the Y-direction that is in the plane of the substrate and orthogonal to the X-direction will cause a Coriolis force to act on the roll proof-mass 102a in the Z-direction. The Coriolis force causes the guided mass system 100 to rotate out-of-plane about the first roll-sense axis. When the guided mass system 100 rotates out-of-plane, the guiding arms 104a and 104b and the roll proof-mass 102a rotate out-of-plane about the first roll-sense axis, as shown in FIG. 1C. The amplitude of the rotation of the guided mass system 100 is proportional to the angular velocity about the roll-input axis. A transducer 112a under the roll proof-mass 102a is used to detect the rotation of the guided mass system 100 about the first roll-sense axis. This rotation provides a measure of the angular velocity about the roll-input axis. A variety of types of transducers could be utilized in the present invention. For example, the transducer 112a could be capacitive, piezoelectric, or optical or the like and its use would be within the spirit and scope of the present invention.

Figure 2:
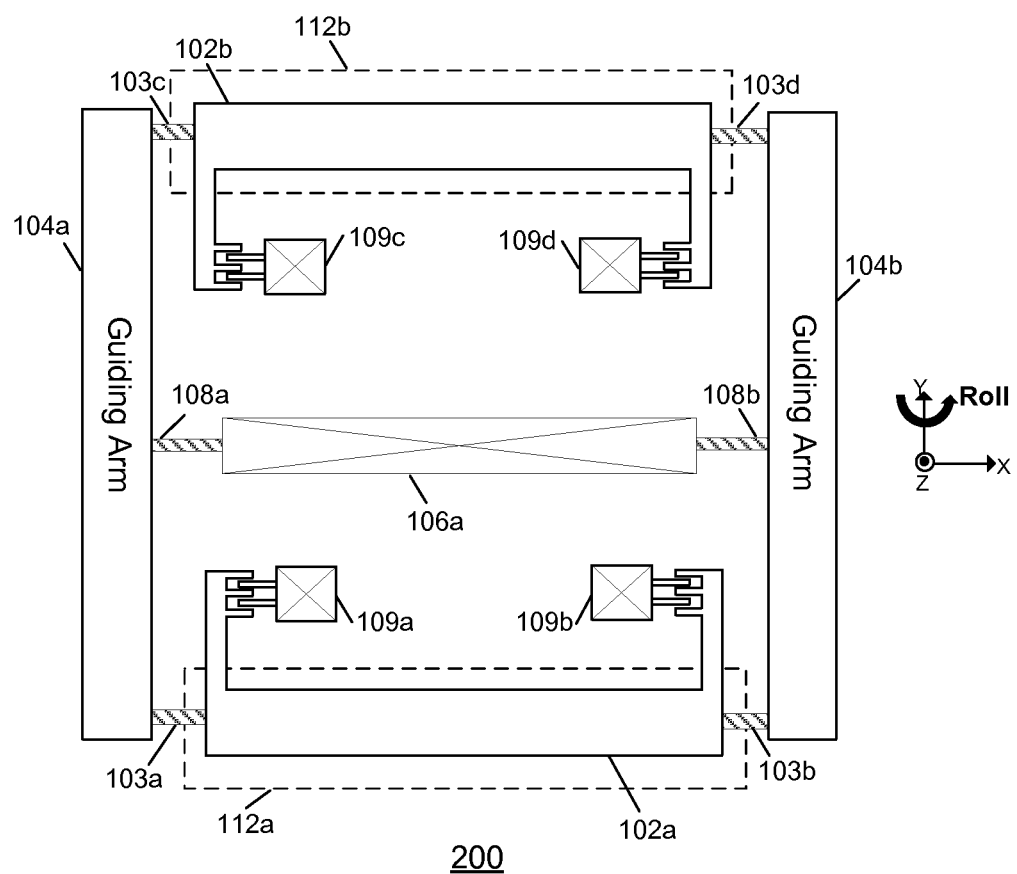
FIG. 2 illustrates an embodiment of a gyroscope comprising a symmetric guided mass system in accordance with the present invention.

FIG. 2 illustrates an embodiment of a gyroscope comprising a symmetric guided mass system 200 in accordance with the present invention. The symmetric guided mass system 200 includes similar elements and connections to that of the guided mass system 100 and those elements and connections have similar reference numbers. The symmetric guided mass system 200 includes an additional roll proof-mass 102b coupled to guiding arms 104a and 104b via springs 103c and 103d. The guiding arms 104a and 104b, roll proof masses 102a and 102b, and coupling springs 103a-d form a planar four-bar linkage. Additional electrostatic actuators 109c and 109d are connected to the additional roll proof-mass 102b to drive the symmetric guided mass system 200.

The symmetric guided mass system 200 can be driven at a drive frequency by a single drive circuit coupled to the actuators 109a-d. When the guided mass system 200 is driven, each of the guiding arms 104a and 104b rotates in-plane about different axes in the Z-direction and the roll proof masses 102a and 102b translate anti-phase along the X-direction. In the present specification, anti-phase means in opposing directions, and in-phase means in the same direction. Angular velocity about the roll-input axis will cause Coriolis forces to act on the roll proof-masses 102a and 102b anti-phase in the Z-direction. The Coriolis forces cause the guided mass system 200 to rotate out-of-plane about the first roll-sense axis. When the guided mass system 200 rotates out-of-plane, the guiding arms 104a and 104b rotate about the first roll-sense axis, and the roll proof-masses 102a and 102b are constrained to move anti-phase out-of-plane by the guiding arms 104a and 104b. Transducers 112a and 112b under the roll proof masses 102a and 102b respectively are used to detect the rotation of the guided mass system 200 about the first roll-sense axis. This rotation provides a measure of the angular velocity about the roll-input axis.

Figure 3:
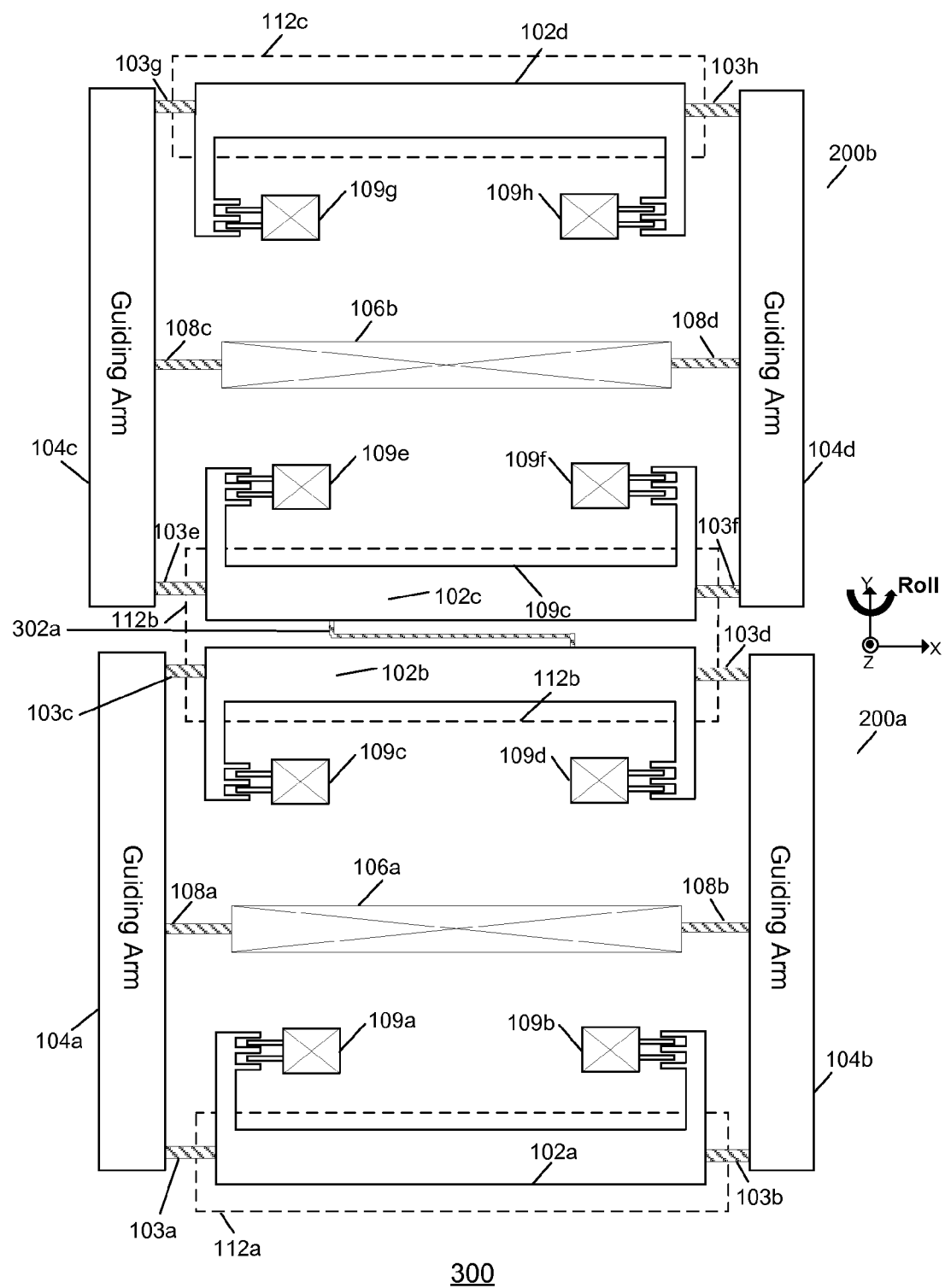
FIG. 3 illustrates an embodiment of a gyroscope comprising a balanced guided mass system in accordance with the present invention.

FIG. 3 illustrates an embodiment of a gyroscope comprising a balanced guided mass system 300 in accordance with the present invention. The balanced guided mass system 300 includes two symmetric guided mass systems 200a and 200b coupled together by a coupling spring 302a. The two symmetric guided mass systems are arranged so that the roll proof-masses 102a-d all move in the X-direction. The symmetric guided mass system 200a rotates out-of-plane about a first roll-sense axis. The symmetric guided mass system 200b rotates out-of-plane about a second roll-sense axis in-plane and parallel to the first roll-sense axis. The coupling spring 302a is connected to roll proof-masses 102b and 102c. The coupling spring 302a is stiff in the X-direction such that roll proof-masses 102b and 102c move together in the X-direction. In this way the two symmetric guided mass systems 200a and 200b are driven together at a drive frequency by a single drive circuit coupled to the actuators 109a-h. The coupling spring 302a is torsionally compliant about an axis in the X-direction so that the symmetric guided mass systems 200a and 200b can rotate anti-phase out-of-plane about the first and second roll-sense axes. The coupling spring 302a is stiff in the Z-direction which prevents the symmetric guided mass systems 200a and 200b from rotating in-phase out-of-plane.

The balanced guided mass system 300 allows for a gyroscope that is sensitive to angular velocity about the roll-input axis and rejects angular acceleration about an X-input axis in the X-direction. Angular velocity about the roll-input axis causes Coriolis forces to act on the roll proof-masses 102a-d in the positive and negative Z-direction. The Coriolis forces cause the symmetric guided mass systems 200a and 200b to rotate anti-phase out-of-plane about the first and second roll-sense axes. Transducers 112a-c under the roll proof masses 102a-d are used to detect the rotations of the symmetric guided mass systems 200a and 200b about the first and second roll-sense axes.

Externally applied angular acceleration about the X-input axis will generate in-phase inertial torques on the symmetric guided mass systems 200a and 200b. However, the symmetric guided mass systems do not rotate because coupling spring 302a prevents in-phase rotation about the first and second roll-sense axes. Transducers 112a and 112c can be connected so that in-phase rotations of the symmetric guided mass systems 200a and 200b are not detected, which provides additional rejection of externally applied angular acceleration about the X-input axis.

Figure 4:
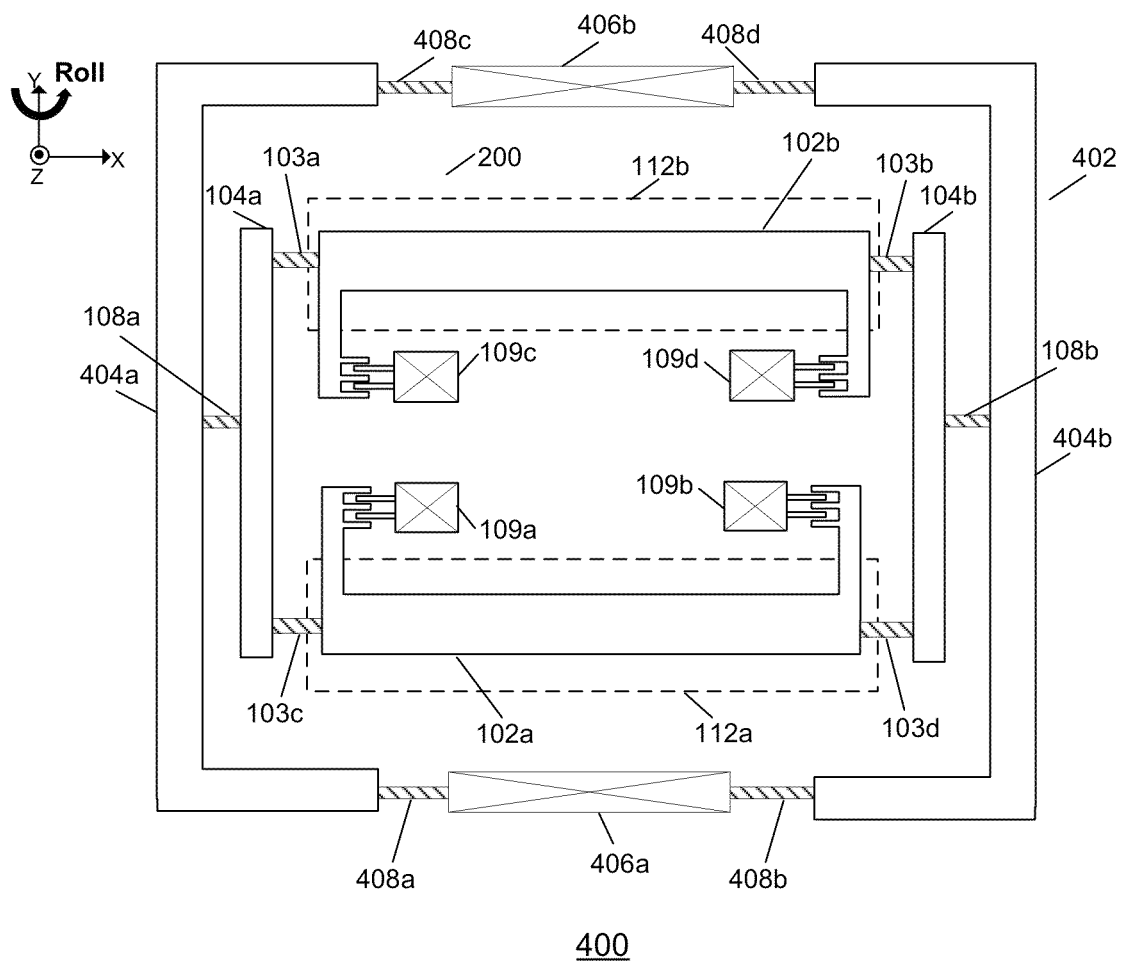
FIG. 4 illustrates an embodiment of a gyroscope comprising a stress relieved guided mass system in accordance with the present invention.

FIG. 4 illustrates an embodiment of a gyroscope comprising a stress relieved guided mass system 400 in accordance with the present invention. The stress relieved guided mass system 400 comprises a symmetric guided mass system 200 coupled to a stress-relief frame 402. The stress relief frame 402 is connected to the guiding arms 104a and 104b via springs 108a and 108b and surrounds the symmetric guided mass system 200. The stress relief frame 402 includes two stress relief frame members 404a and 404b which are coupled to the anchors 406a and 406b respectively via stress relief springs 408a-d. The stress relief members 404a and 404b can also be flexible.

Anchors 406a and 406b might experience motion such as translation, expansion, or shearing as a result of thermal stress, packaging stress, or other externally applied stresses. Anchor motion can cause stress, such as tension, on the symmetric guided mass system, resulting in errors such as changing stiffness and resonant frequencies; anchor motion can also cause unwanted motion of the symmetric guided mass system resulting in errors. The stress-relief frame 402 reduces stresses and unwanted motion of the symmetric guided mass system 200.

Figure 5:
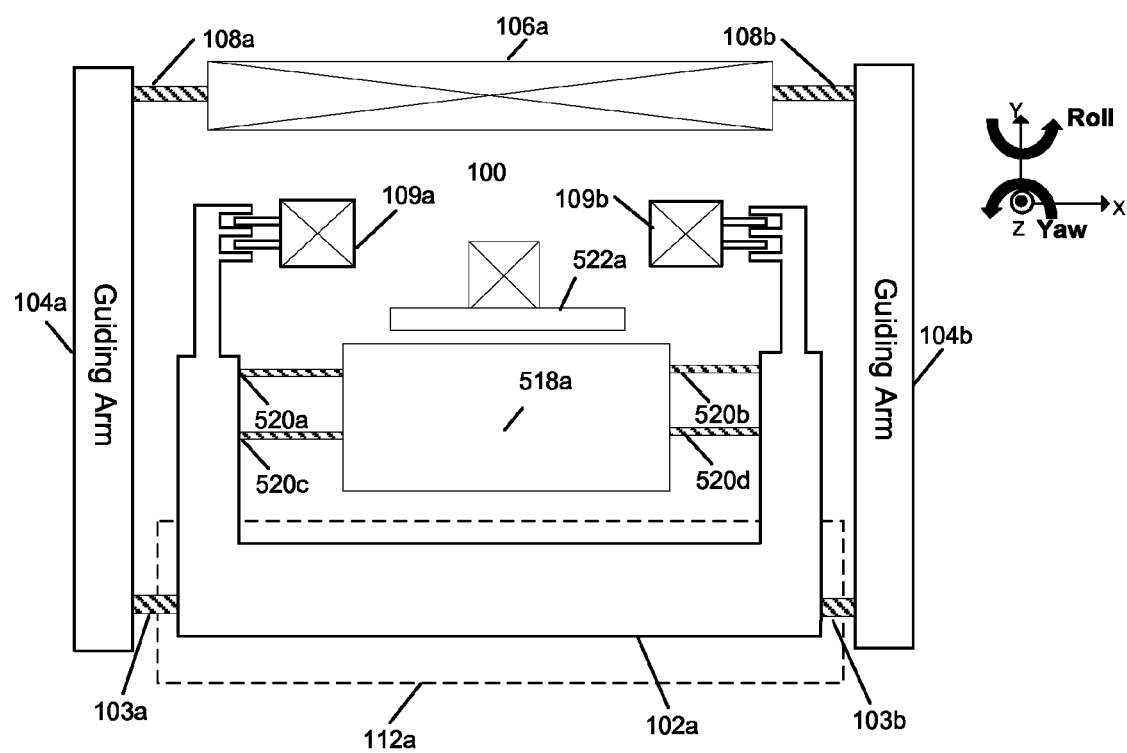
FIG. 5 illustrates a first embodiment of a dual-axis gyroscope comprising a guided mass system in accordance with the present invention.

FIG. 5 illustrates an embodiment of a dual-axis gyroscope comprising guided mass system 500 in accordance with the present invention. The guided mass system 500 comprises a guided mass system 100 coupled to a yaw proof-mass 518a. The yaw proof-mass 518a is flexibly connected to the roll proof-mass 102a via yaw-springs 520a-d. Yaw-springs 520a-d are stiff in the X-direction such that when the guided mass system is driven, the yaw proof-mass 518a also translates with the roll proof-mass 102a in the X-direction.

Angular velocity about a yaw-input axis in the Z-direction will cause a Coriolis force to act on the yaw proof-mass 518a in the Y-direction resulting in motion of the yaw proof-mass 518a in the Y-direction. A transducer 522a is used to sense the motion of the yaw proof-mass 518a in the Y-direction which provides a measure of the angular velocity about the yaw-input axis.

Figure 6:
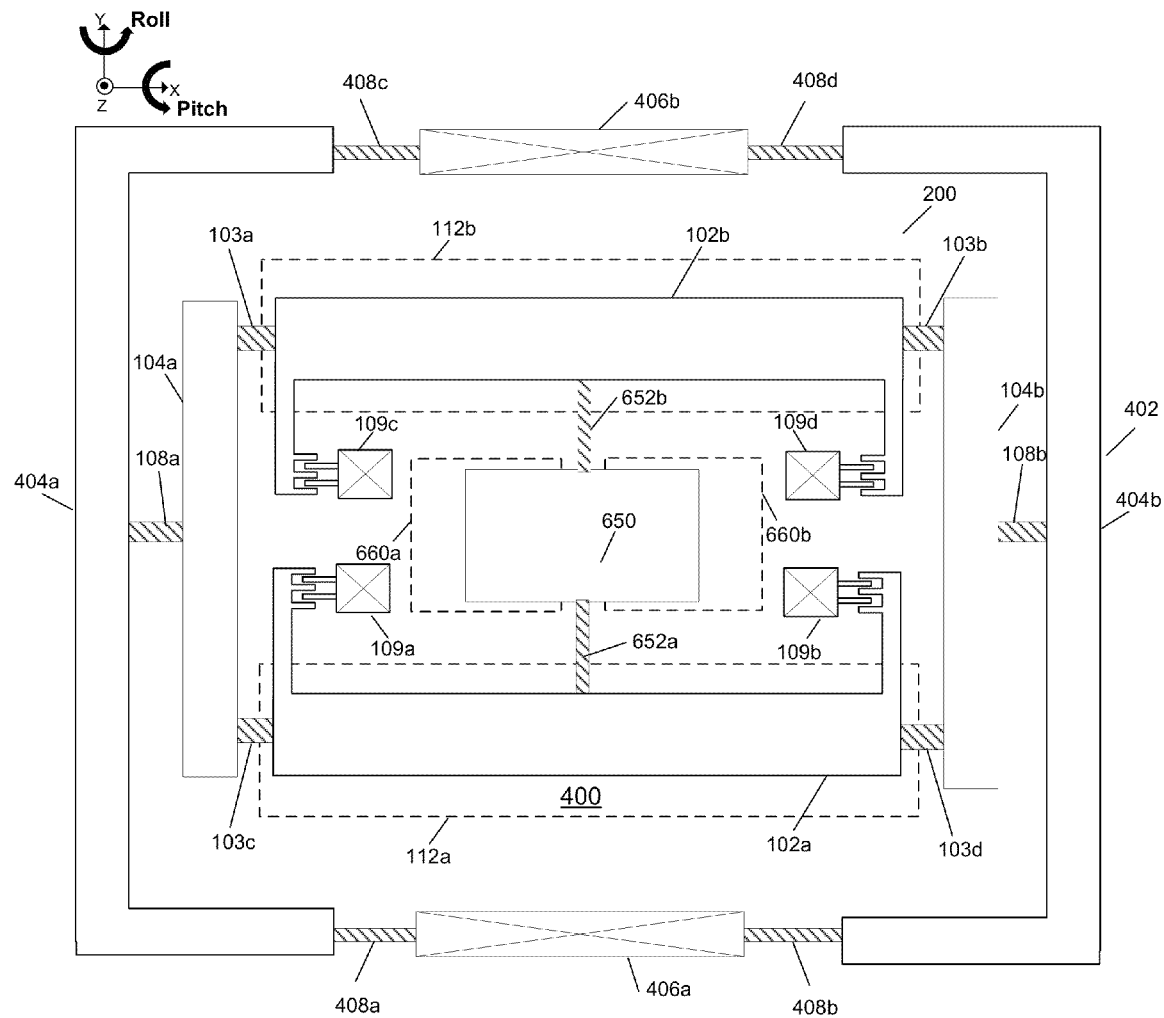
FIG. 6 illustrates a second embodiment of a dual-axis gyroscope comprising a guided mass system in accordance with the present invention.

FIG. 6 illustrates a second embodiment of a dual-axis gyroscope comprising a guided mass system 600 surrounded by a stress relief frame 402 in accordance with the present invention The guided mass system 600 comprises a symmetric guided mass system 200 coupled to a pitch proof-mass 650a. The stress relief frame 402 is connected to the guiding arms 104a and 104b via springs 108a and 108b and surrounds the symmetric guided mass system 200.

The pitch proof-mass 650a is flexibly connected to the two roll proof-masses 102a and 102b via springs 652a and 652b. Springs 652a and 652b are torsionally compliant such that pitch proof-mass 650a can rotate out-of-plane about a pitch sense axis in the Y-direction. Springs 652a and 652b are compliant in-plane such that when the roll proof-masses 102a and 102b are driven anti-phase in the X-direction; the pitch proof-mass 650a rotates in-plane about an axis in the Z-direction.

Angular velocity about the pitch-input axis will cause Coriolis forces to act on the pitch proof-mass 650a resulting in a torque that rotates the pitch proof-mass 650a about the pitch-sense axis. The amplitude of the rotation of the pitch proof-mass 650a is proportional to the angular velocity about the pitch-input axis. Transducers 660a and 660b are disposed on opposite sides along the X-direction under the pitch proof-mass 650a and detect the rotation of the pitch proof-mass about the pitch-sense axis. This rotation provides a measure of the angular velocity about the pitch-input axis.

Figure 7:
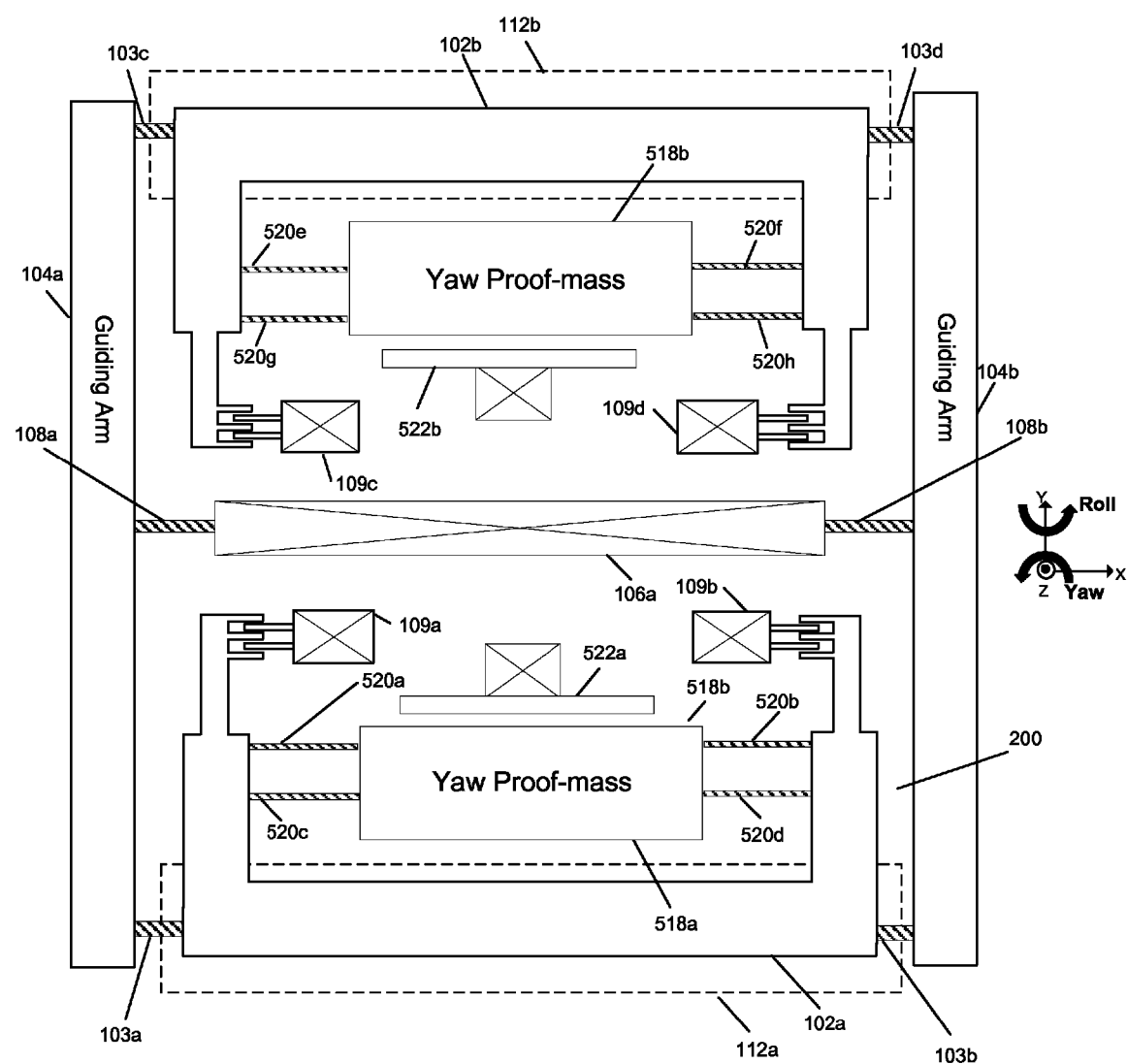
FIG. 7 illustrates a third embodiment of a dual-axis gyroscope comprising a guided mass system in accordance with the present invention.

FIG. 7 illustrates a third embodiment of a dual-axis gyroscope comprising a guided mass system 700 in accordance with the present invention. The guided mass system 700 comprises a symmetric guided mass system 200 coupled to two yaw proof masses 518a and 518b. The yaw proof-masses 518a and 518b are flexibly connected to the roll proof-masses 102a and 102b via springs 520a-d and 520e-h respectively. When the guided mass system 700 is driven, the yaw proof-masses 518a and 518b also translate anti-phase in the X-direction.

Angular velocity about the yaw-input axis will cause Coriolis forces to act on the yaw proof-masses 518a and 518b resulting in motion of the yaw proof-masses 518a and 518b anti-phase along the Y-direction. The amplitude of the motion of the yaw proof-masses along the Y-direction is proportional to the angular velocity. Transducers 522a and 522b are used to sense the motion of the respective yaw proof masses 518a and 518b along the Y-direction.

Figure 8:
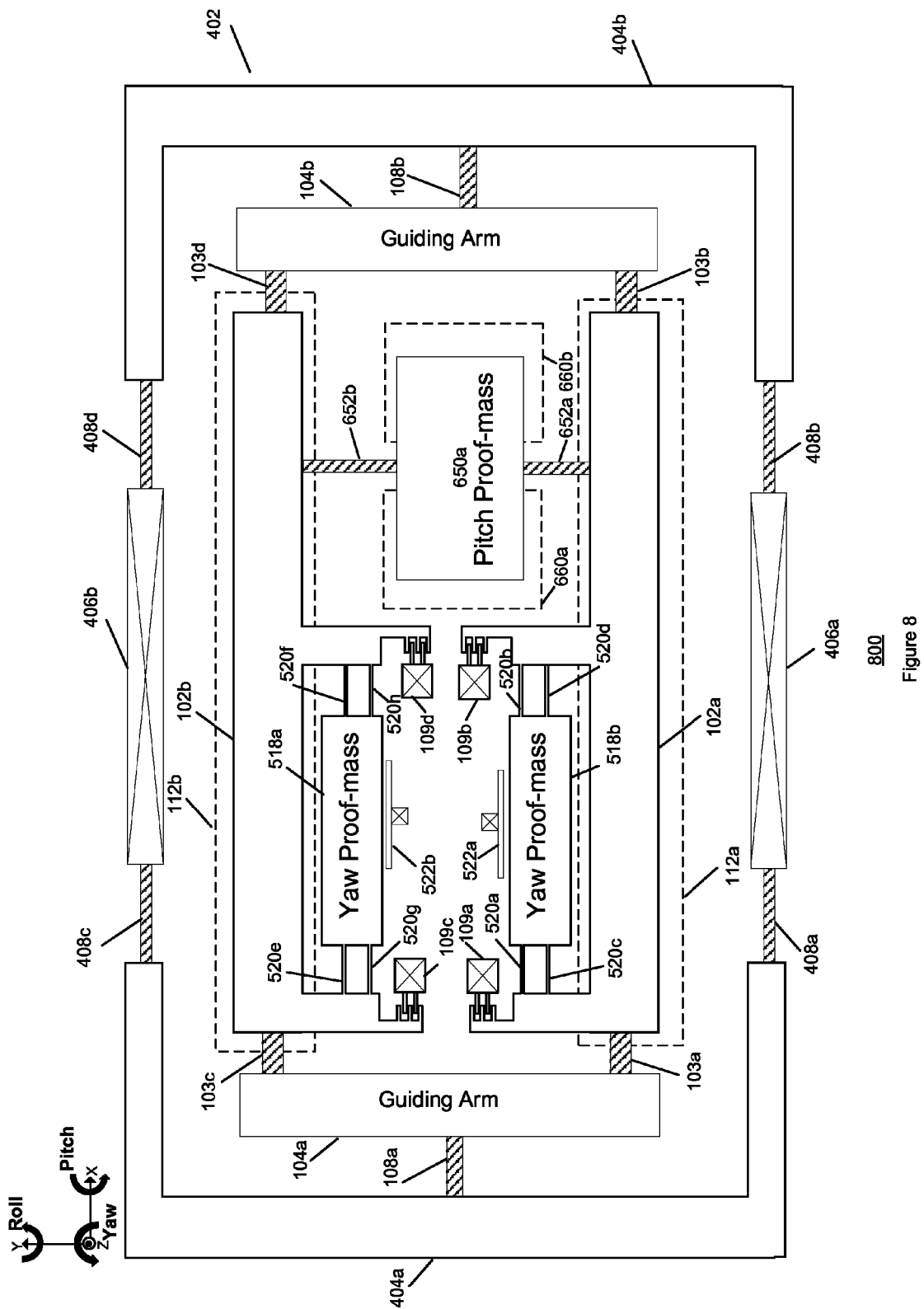
FIG. 8 illustrates an embodiment of a tri-axis gyroscope comprising a guided mass system in accordance with the present invention.

FIG. 8 illustrates an embodiment of a tri-axis gyroscope comprising a guided mass system 800 surrounded by a stress relief frame 402 in accordance with the present invention. The guided mass system 800 comprises guided mass system 600 coupled to two yaw proof masses 518a and 518b. The stress relief frame 402 is connected to the guiding arms 104a and 104b via springs 108a and 108b and surrounds the symmetric guided mass system 200. The yaw proof-masses 518a and 518b are flexibly connected to the roll proof-masses 102a and 102b via springs 520a-d and 520e-h respectively. When the guided mass system 800 is driven, the yaw proof-masses 518a and 518b also translate anti-phase in the X-direction.

Angular velocity about the roll-input axis will cause Coriolis forces to act on the roll proof-masses 102a and 102b anti-phase in the Z-direction. The Coriolis forces cause the guided mass system 800 to rotate out-of-plane about the first roll-sense axis. When the guided mass system 800 rotates out-of-plane, the guiding arms 104a and 104b rotate about the first roll-sense axis, and the roll proof-masses 102a and 102b are constrained to move anti-phase out-of-plane by the guiding arms 104a and 104b. Transducers 112a and 112b under the roll proof masses 102a and 102b respectively are used to detect the rotation of the guided mass system 800 about the first roll-sense axis. This rotation provides a measure of the angular velocity about the roll-input axis.

Angular velocity about the pitch-input axis will cause Coriolis forces to act on the pitch proof-mass 650a resulting in a torque that rotates the pitch proof-mass 650a about the pitch-sense axis. The amplitude of the rotation of the pitch proof-mass 650a is proportional to the angular velocity about the pitch-input axis. Transducers 660a and 660b are disposed on opposite sides along the X-direction under the pitch proof-mass 650a and detect the rotation of the pitch proof-mass about the pitch-sense axis which provides a measure of the angular velocity about the pitch-input axis.

Angular velocity about the yaw-input axis will cause Coriolis forces to act on the yaw proof-masses 518a and 518b resulting in motion of the yaw proof-masses 518a and 518b anti-phase along the Y-direction. The amplitude of the motion of the yaw proof-masses along the Y-direction is proportional to the angular velocity. Transducers 522a and 522b are used to sense the motion of the respective yaw proof masses 518a and 518b along the Y-direction.

Figure 9:
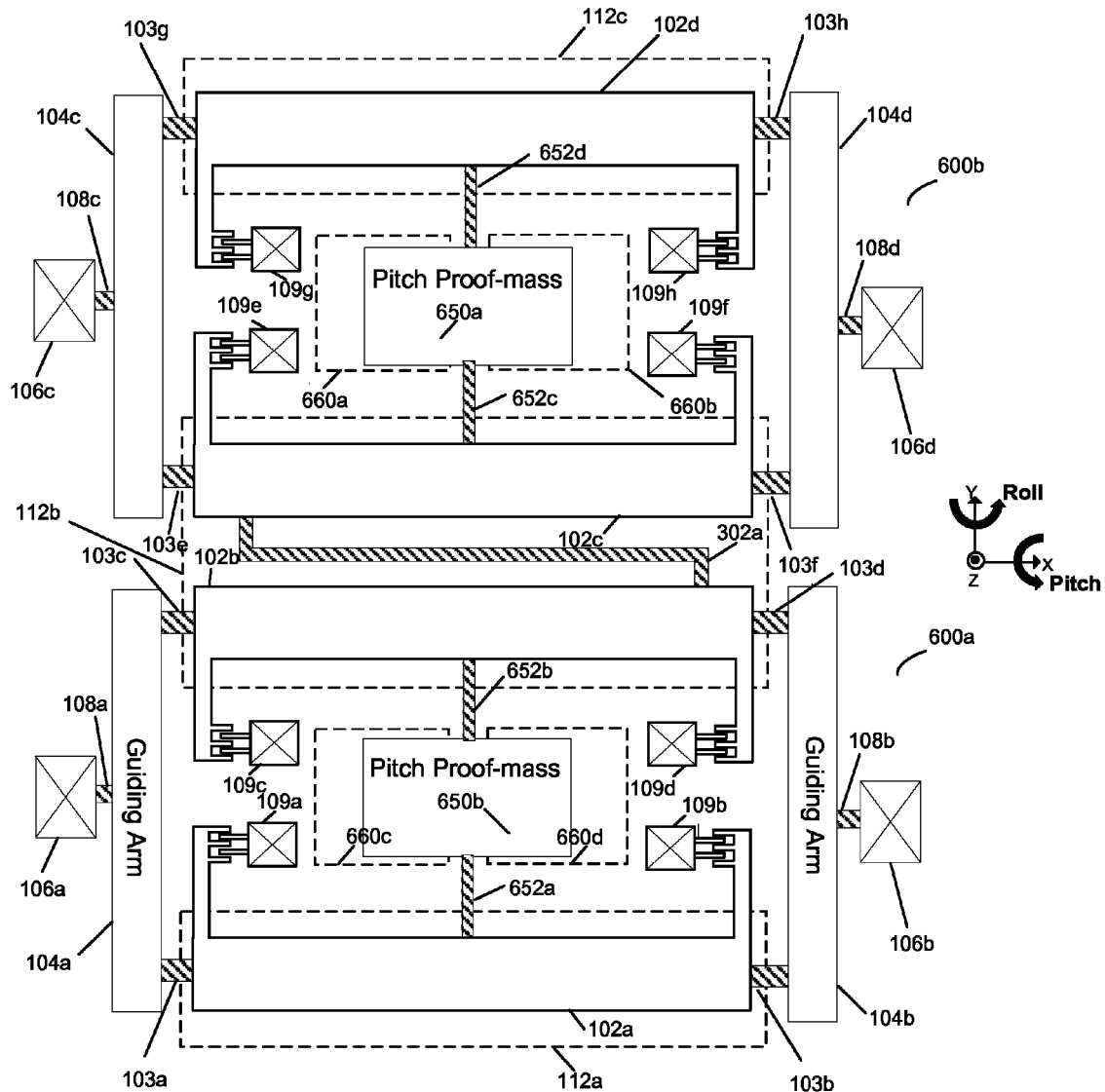
FIG. 9 illustrates a first embodiment of a dual-axis gyroscope comprising a balanced guided mass system in accordance with the present invention.

FIG. 9 illustrates an embodiment of a dual-axis gyroscope comprising a balanced guided mass system 900 in accordance with the present invention. The guided mass system 900 comprises two guided mass systems 600a and 600b coupled together by coupling spring 302a. The guided mass systems 600a and 600b are connected to anchoring points 106a-d via springs 108a-d. In another embodiment the guided mass systems 600a and 600b can be coupled to the stress relief frame 402 via springs 108a-d.

The symmetric guided mass system 600a rotates out-of-plane about a first roll-sense axis. The symmetric guided mass system 600b rotates out-of-plane about a second roll-sense axis in-plane and parallel to the first roll-sense axis. The coupling spring 302a is connected to roll proof-masses 102b and 102c. The coupling spring 302a is torsionally compliant about an axis in the X-direction so that the symmetric guided mass systems 600a and 600b can rotate anti-phase out-of-plane about the first and second roll-sense axes. The coupling spring 302a is stiff in the Z-direction which prevents the symmetric guided mass systems 600a and 600b from rotating in-phase out-of-plane. Pitch proof-masses 650a and 650b are each flexibly connected to their respective four roll proof-masses 102a-102d via springs 652a-d. Springs 652a and 652b are torsionally compliant such that pitch proof-mass 650a can rotate out-of-plane about a first pitch sense axis in the Y-direction, and springs 652c and 652d are torsionally compliant such that pitch proof-mass 650b can rotate out-of-plane about a second pitch sense axis in the Y-direction.

The two symmetric guided mass systems 600a and 600b are arranged so that the roll proof-masses 102a-d all move in the X-direction. The coupling spring 302a is stiff in the X-direction such that roll proof-masses 102b and 102c move together in the X-direction. The roll proof-masses 102a and 102d move in opposite of roll proof-masses 102b and 102c. Springs 652a-d are compliant in-plane such that when the roll proof-masses 102a-d are driven, the pitch proof-masses 650a and 650b rotate anti-phase in-plane about separate axes in the Z-direction. Electrostatic actuators 109a-h such as comb drives, are connected to the roll proof-masses 102a-d to drive the balanced guided mass system 900. The two guided mass systems 600a and 600b comprising roll proof-masses 102a-d and pitch proof-masses 650a and 650b are driven together at a drive frequency by a single drive circuit coupled to the actuators 109a-h.

Angular velocity about the pitch-input axis in the X-direction will cause Coriolis forces to act on the pitch proof-masses 650a and 650b about the first and second pitch-sense axes respectively. The Coriolis forces cause the pitch proof masses 650a and 650b to rotate anti-phase out-of-plane about the first and the second pitch-sense axes. The amplitudes of the rotations of the pitch proof-masses 650a and 650b about the first and the second pitch-sense axes are proportional to the angular velocity about the pitch-input axis. Transducers 660a-660d under the pitch proof masses 650a and 650b are used to detect the anti-phase rotations about the first and the second pitch-sense axes. Externally applied angular acceleration about the pitch-input axis will generate inertial torques in-phase on the pitch proof masses 650a and 650b causing them to rotate in-phase about the first and the second pitch-sense axes. Transducers 660a and 660d can be coupled and transducers 660b and 660c can be coupled so that in-phase rotations of the pitch proof-masses 650a and 650b are not detected, but anti-phase rotations are detected.

Angular velocity about the roll-input axis will cause Coriolis forces to act on the roll proof-masses 102a-d in the Z-direction. The Coriolis forces cause the symmetric guided mass systems 600a and 600b to rotate anti-phase out-of-plane about the first and second roll-sense axes. Transducers 112a-c under the roll proof masses 102a-d are used to detect the rotations of the symmetric guided mass systems 600a and 600b. Externally applied angular acceleration about the pitch-input axis will generate in-phase inertial torques on the symmetric guided mass systems 600a and 600b. However, the symmetric guided mass systems 600a and 600b do not rotate because coupling spring 302a prevents in-phase rotation about the first and second roll-sense axes. Transducers 112a and 112c can be coupled so that in-phase rotations of the symmetric guided mass systems 600a and 600b are not detected but anti-phase rotations are detected.

FIG. 10 illustrates another embodiment of a dual-axis gyroscope comprising a balanced guided mass system 1000 in accordance with an embodiment of the present invention. The guided mass system 1000 includes two symmetric guided mass systems 700a and 700b which are connected by a coupling spring 302a.

The two symmetric guided mass systems 700a and 700b are arranged so that the roll proof-masses 102a-d all move in the X-direction. The symmetric guided mass system 700a rotates out-of-plane about a first roll-sense axis. The symmetric guided mass system 700b rotates out-of-plane about a second roll-sense axis in-plane and parallel to the first roll-sense axis. The coupling spring 302a is connected to roll proof-masses 102b and 102c. The coupling spring 302a is stiff in the X-direction such that roll proof-mass 102b and 102c move together in the X-direction. In this way the two guided mass systems 700a and 700b are driven together at a drive frequency by a single drive circuit coupled to the actuators 109a-h. The coupling spring 302a is torsionally compliant about an axis in the X-direction so that the symmetric guided mass systems 700a and 700b can rotate anti-phase out-of-plane about the first and second roll-sense axes. The coupling spring 302a is stiff in the Z-direction which prevents the symmetric guided mass systems 700a and 700b from rotating in-phase out-of-plane.

Angular velocity about the yaw-input axis will cause Coriolis forces to act on the yaw proof-masses 518a-d resulting in motion of the yaw proof-masses 518a-d along the Y-direction. The amplitude of the motions of the yaw proof-masses 518a-d is proportional to the angular velocity about the yaw-input axis. Transducers 522a-d are used to sense the motion of the respective yaw proof masses 518a-d in the Y-direction.

Angular velocity about the roll-input axis will cause Coriolis forces to act on the roll proof-masses 102a-d in the Z-direction. The Coriolis forces cause the symmetric guided mass systems 700a and 700b to rotate anti-phase out-of-plane about the first and second roll-sense axes. The amplitudes of the rotations of the symmetric guided mass systems 700a and 700b are proportional to the angular velocity. Transducers 112a-c under the roll proof masses 102a-d are used to detect the rotations of the symmetric guided mass systems 700a and 700b. Externally applied angular acceleration about the pitch-input axis will generate in-phase inertial torques on the symmetric guided mass systems 700a and 700b. However, the symmetric guided mass systems 700a and 700b do not rotate because coupling spring 302a prevents in-phase rotation about the first and second roll-sense axes. Transducers 112a and 112c can be coupled so that in-phase rotations of the symmetric guided mass systems 700a and 700b are not detected but anti-phase rotations are detected.

Figure 11:
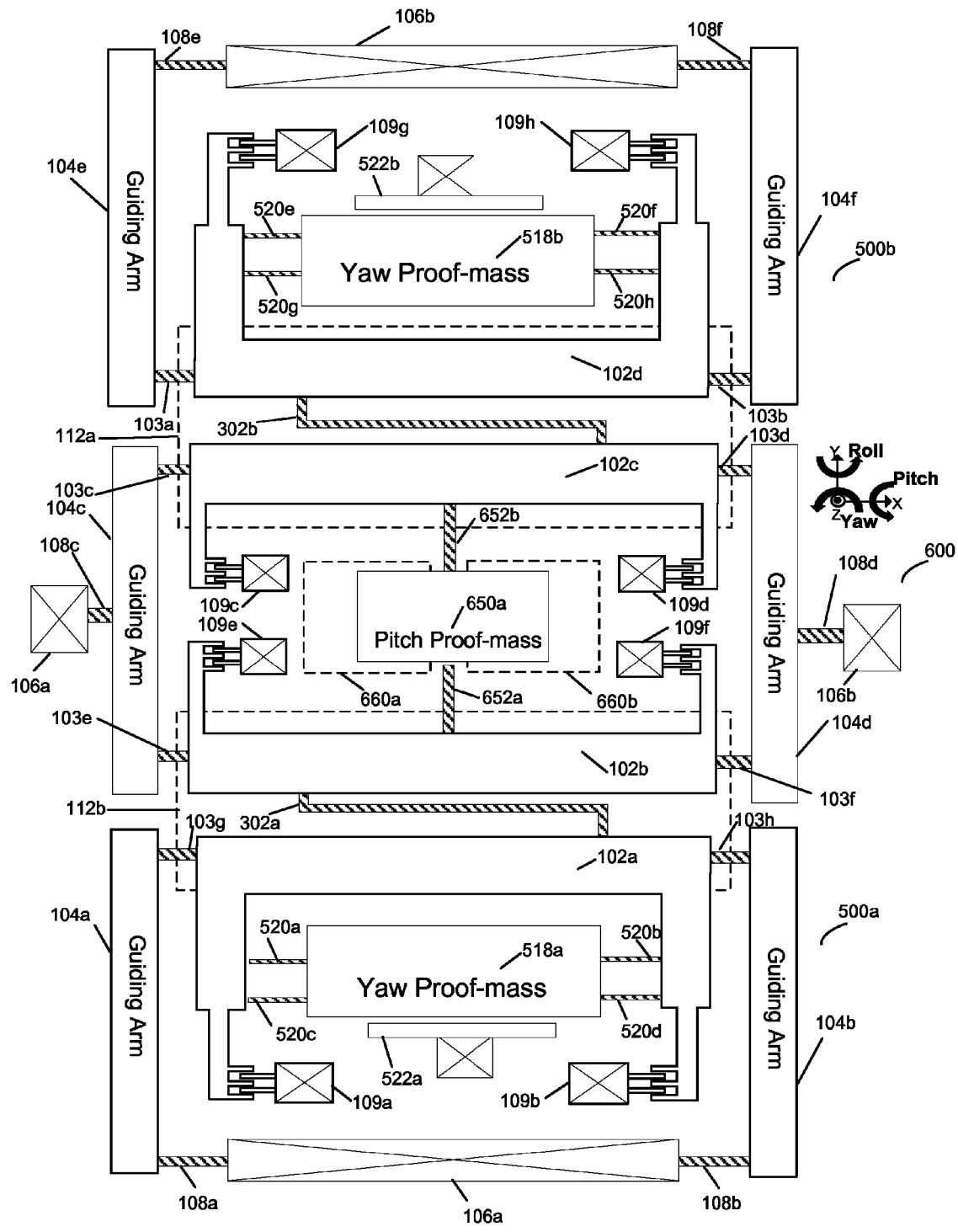
FIG. 11 illustrates a first embodiment of a tri-axis gyroscope comprising a multiple guided mass system in accordance with the present invention.

FIG. 11 illustrates an embodiment of a tri-axis gyroscope comprising a multiple guided mass system 1100 in accordance with the present invention. The multiple guided mass system 1100 includes two guided mass systems 500a and 500b coupled to a guided mass system 600 by coupling springs 302a and 302b.

The guided mass systems 500a, 500b and 600 are arranged so that the roll proof-masses 102a-d all move in the X-direction, the pitch proof-mass 650a rotates about an axis in the Z-direction, and the yaw proof-masses 518a and 518b move anti-phase in the X-direction. The guided mass system 500a rotates out-of-plane about a first roll-sense axis. The symmetric guided mass system 600 rotates out-of-plane about a second roll-sense axis parallel to the first roll-sense axis. The guided mass system 500b rotates out-of-plane about a third roll-sense axis parallel to the first and second roll-sense axes. The first coupling spring 302a is connected to roll proof-masses 102a and 102b. The coupling spring 302a is stiff in the X-direction such that roll proof-mass 102a and 102b move together in the X-direction. The second coupling spring 302b is connected to roll proof-masses 102c and 102d. The coupling spring 302b is stiff in the X-direction such that roll proof-mass 102c and 102d move together in the X-direction. In this way the guided mass systems 500a, 500b, and 600 are driven together at a drive frequency by a single drive circuit coupled to the actuators 109a-h.

The coupling spring 302a is torsionally compliant about an axis in the X-direction so that the guided mass systems 500a and 600 can rotate out-of-plane about the first and second roll-sense axes anti-phase. The coupling spring 302a prevents the symmetric guided mass systems 500a and 600 from rotating out-of-plane in-phase.

The coupling spring 302b is also torsionally compliant about an axis in the X-direction so that the guided mass systems 500b and 600 can rotate out-of-plane about the second and third roll-sense axes anti-phase. The coupling spring 302b prevents the symmetric guided mass systems 500b and 600 from rotating out-of-plane in-phase.

Angular velocity about the pitch-input axis will cause Coriolis forces to act on the pitch proof-mass 650a resulting in a torque that rotates the pitch proof-mass 650a about the pitch-sense axis. The amplitude of the rotation of the pitch proof-mass 650a is proportional to the angular velocity about the pitch-input axis. Transducers 660a and 660b are disposed on opposite sides along the X-direction under the pitch proof-mass 650a and detect the rotation of the pitch proof-mass about the pitch-sense axis. The rotation provides a measure of the angular velocity about the pitch-input axis.

Angular velocity about the roll-input axis will cause Coriolis forces to act on the roll proof-masses 102a and 102b in a Z-direction and on roll proof-masses 102c and 102d in the opposite Z-direction. The Coriolis forces cause the guided mass systems 500a, 600, and 500b to rotate out-of-plane about the first, second, and third roll-sense axis respectively. Transducer 112a under the roll proof masses 102a and 102b and transducer 112b under the roll proof masses 102c and 102d are used to detect the rotation of the guided mass system 1100. This rotation provides a measure of the angular velocity about the roll-input axis.

Angular velocity about the yaw-input axis will cause Coriolis forces to act on the yaw proof-masses 518a and 518b resulting in motion of the yaw proof-masses 518a and 518b anti-phase along the Y-direction. The amplitude of the motion of the yaw proof-masses along the Y-direction is proportional to the angular velocity. Transducers 522a and 522b are used to sense the motion of the respective yaw proof masses 518a and 518b along the Y-direction.

Figure 12A:
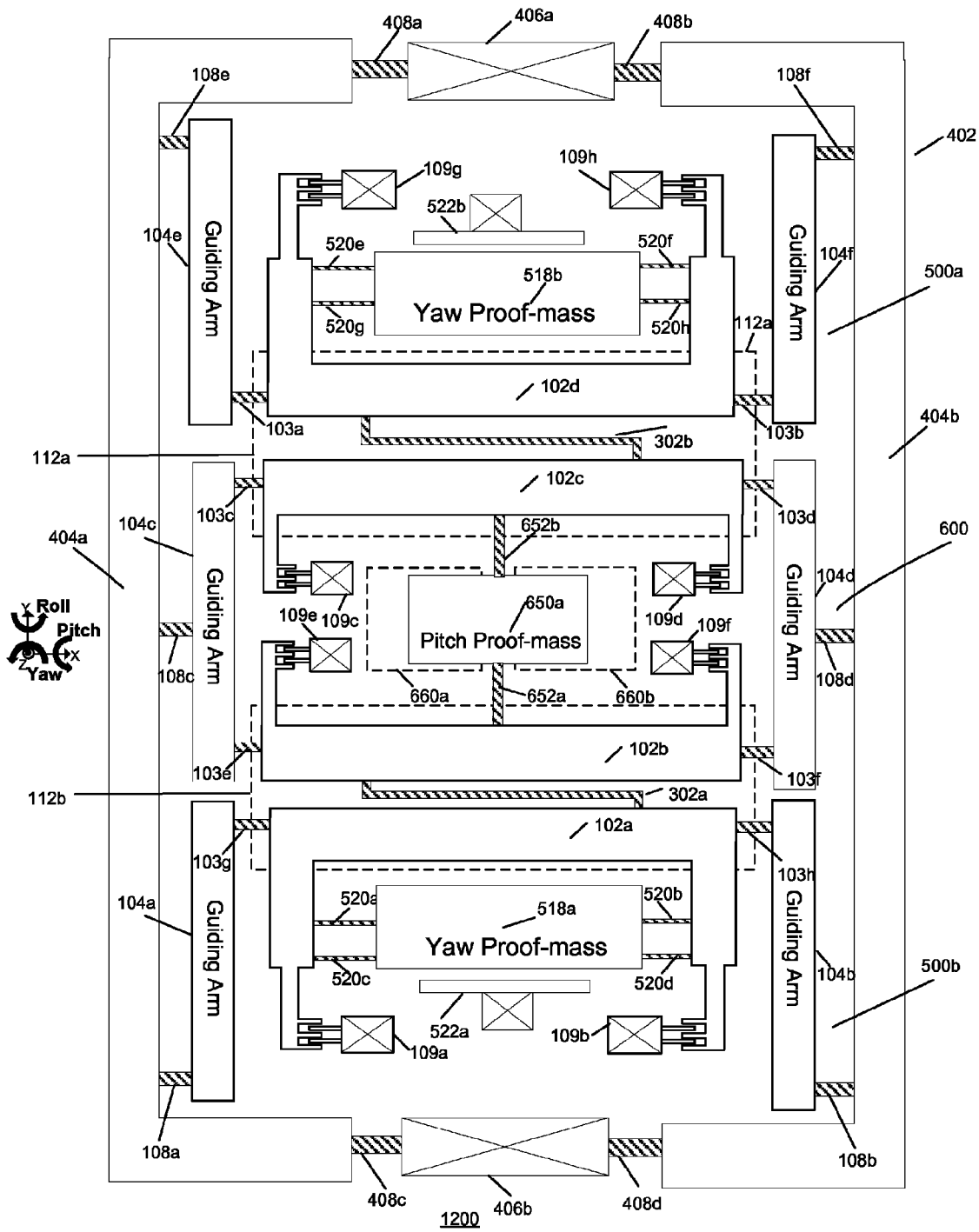
FIGS. 12A-12E illustrate a second embodiment of a tri-axis gyroscope comprising a stress relieved multiple guided mass system in accordance with the present invention.

FIG. 12A illustrates an embodiment of a tri-axis gyroscope comprising a multiple guided mass system 1200 in accordance with the present invention. The multiple guided mass system 1200 comprises the multiple guided mass system 1100 coupled to a stress relief frame 402.

The stress relief frame 402 is connected to the guiding arms 104a-f via springs 108a-f respectively and surrounds the multiple guided mass system 1100.

Figure 12B:
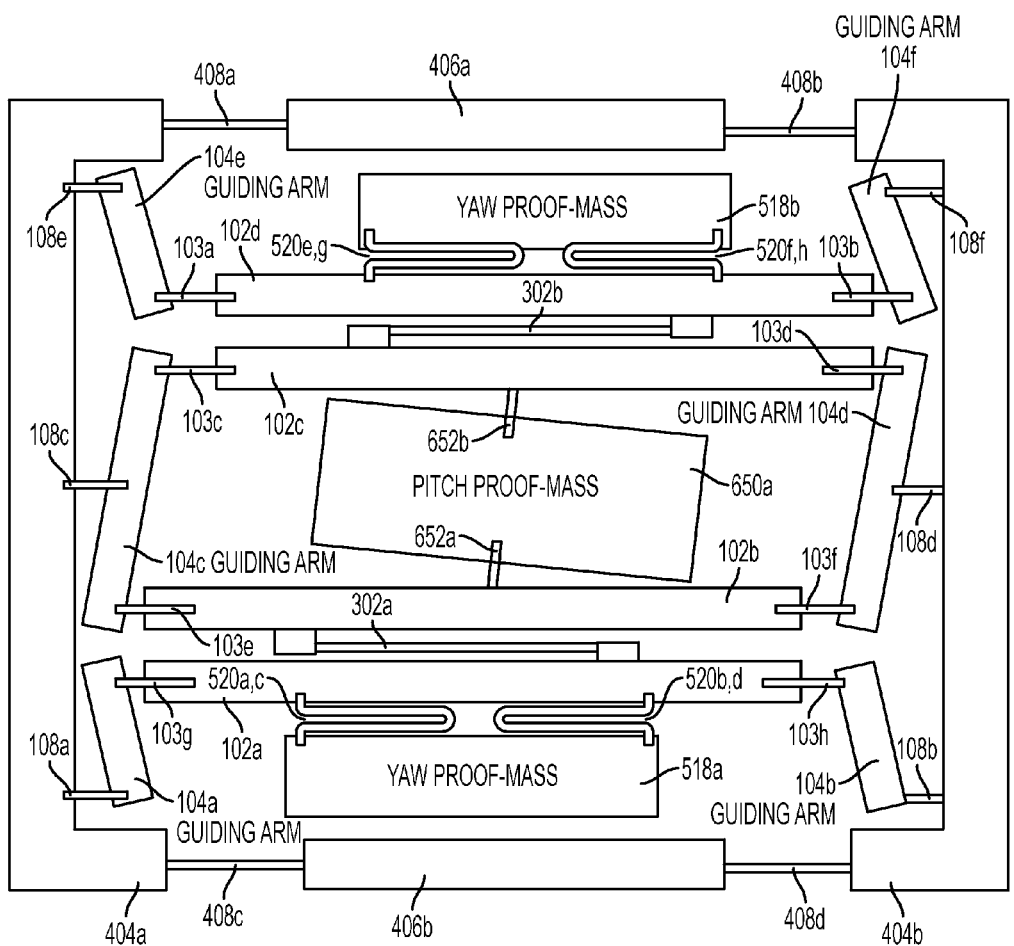

The guided mass systems 500a, 500b and 600 are arranged so that when the roll proof-masses 102a-d all move in the X-direction, the pitch proof-mass 650a rotates about an axis in the Z-direction, and the yaw proof-masses 518a and 518b move anti-phase in the X-direction, as shown in FIG. 12B. The guided mass systems 500a, 500b, and 600 are driven together at a drive frequency by a single drive circuit coupled to the actuators 109a-h.

Figure 12C:
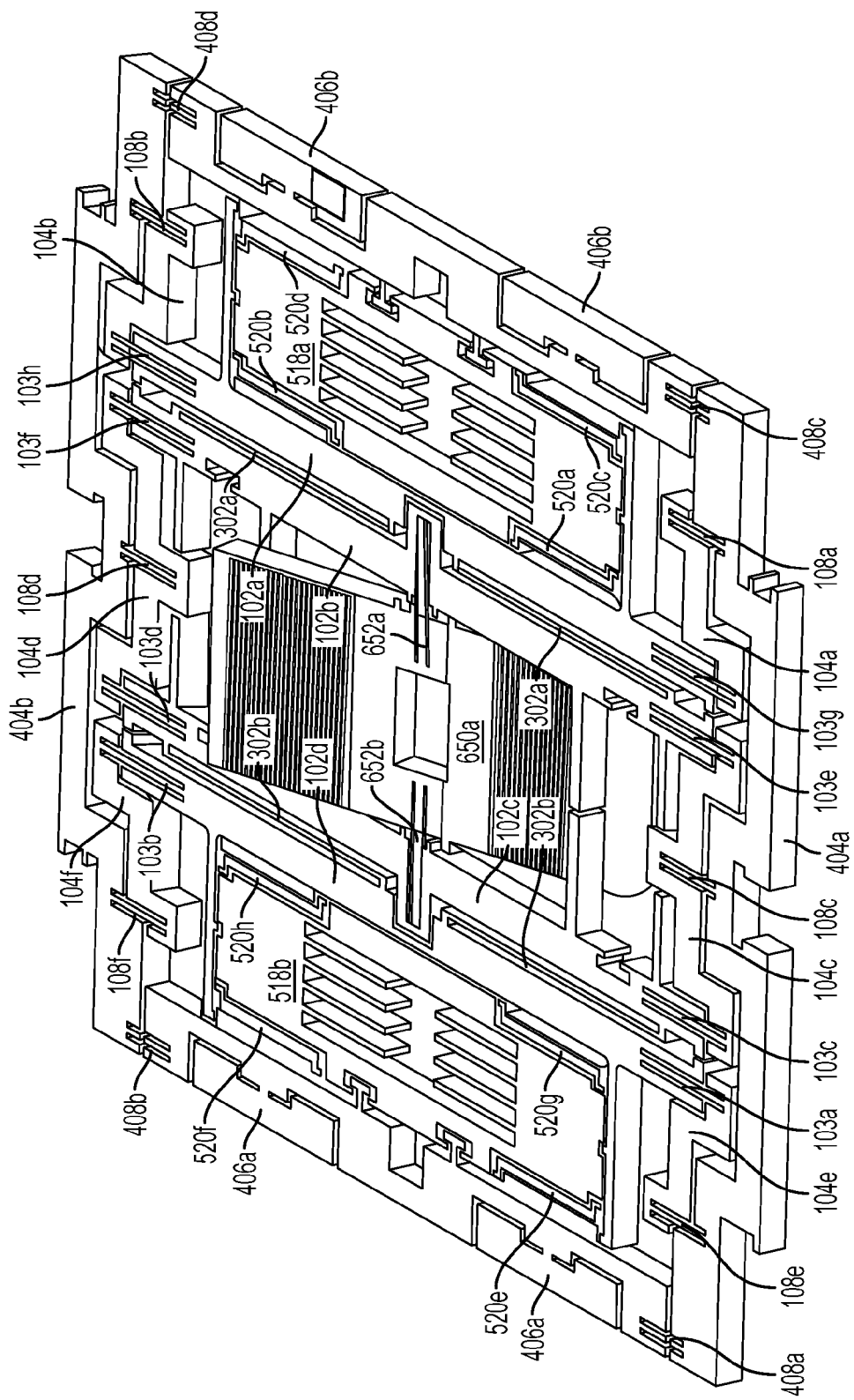

Angular velocity about the pitch-input axis will cause Coriolis forces to act on the pitch proof-mass 650a resulting in a torque that rotates the pitch proof-mass 650a about the pitch-sense axis, as shown in FIG. 12C. The amplitude of the rotation of the pitch proof-mass 650a is proportional to the angular velocity about the pitch-input axis. Transducers 660a and 660b are disposed on opposite sides along the X-direction under the pitch proof-mass 650a and detect the rotation of the pitch proof-mass about the pitch-sense axis. The rotation provides a measure of the angular velocity about the pitch-input axis.

Figure 12D:
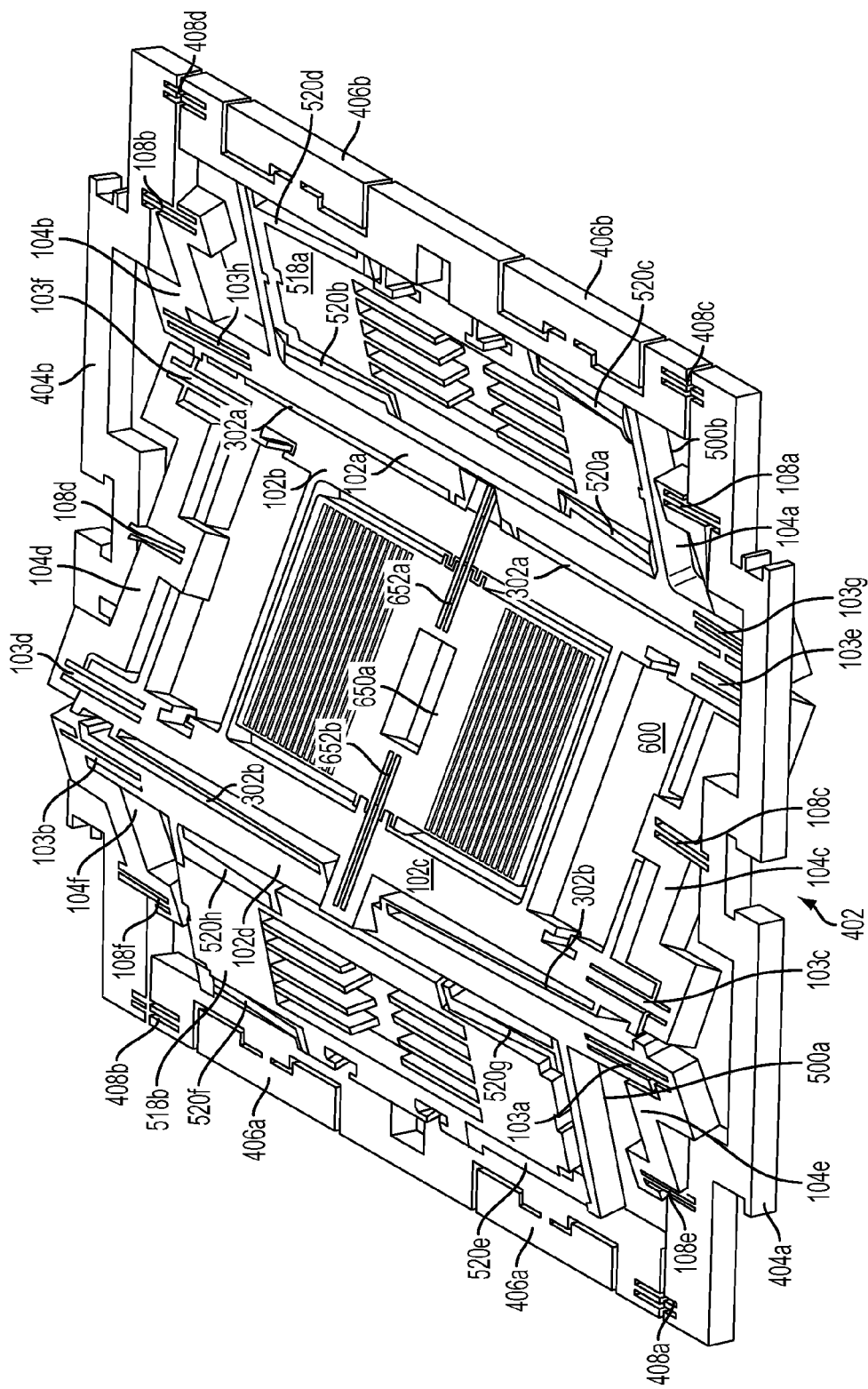

Angular velocity about the roll-input axis will cause Coriolis forces to act on the roll proof-masses 102a and 102b in a Z-direction and on roll proof-masses 102c and 102d in the opposite Z-direction. The Coriolis forces cause the guided mass systems 500a, 600, and 500b to rotate out-of-plane about the first, second, and third roll-sense axis respectively, as shown in FIG. 12D. Transducer 112a under the roll proof masses 102a and 102b and transducer 112b under the roll proof masses 102c and 102d are used to detect the rotation of the guided mass system 1100. This rotation provides a measure of the angular velocity about the roll-input axis.

Figure 12E:
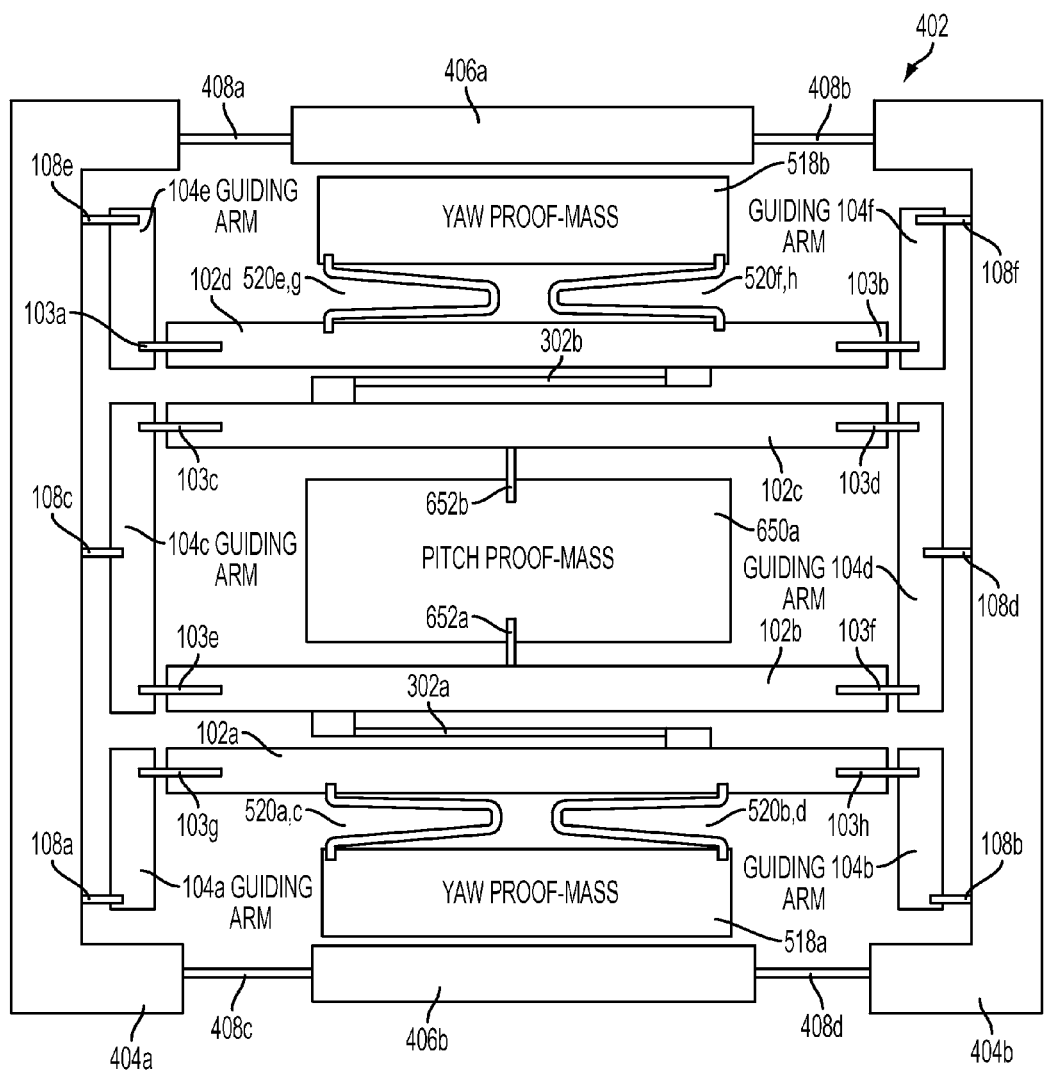

Angular velocity about the yaw-input axis will cause Coriolis forces to act on the yaw proof-masses 518a and 518b resulting in motion of the yaw proof-masses 518a and 518b anti-phase along the Y-direction, as shown in FIG. 12E. The amplitude of the motion of the yaw proof-masses along the Y-direction is proportional to the angular velocity. Transducers 522a and 522b are used to sense the motion of the respective yaw proof masses 518a and 518b along the Y-direction.

Conclusion

A gyroscope in accordance with the present invention includes one or more guided mass systems that oscillates at one frequency and is capable of sensing angular rate about multiple axes. In a preferred embodiment, one drive motion requires only one drive circuit, which lowers cost and power. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A gyroscope comprising;
a substrate;
a guided mass system, the guided mass system comprising at least one proof-mass and at least one guiding arm; wherein the at least one proof-mass and the at least one guiding arm are disposed in a plane parallel to the substrate; the at least one proof-mass being coupled to the at least one guiding arm; the at least one guiding arm being coupled to the substrate through at least one spring; wherein the proof-mass vibrates in a first direction and the guiding arm rotates in plane;
wherein the at least one guiding arm and the at least one proof-mass are able to rotate out of the plane about a first sense axis in response to angular velocity about a first input axis that is in the plane and orthogonal to the first direction, the first sense axis being in the plane and parallel to the first direction;
an actuator for vibrating the at least one proof-mass in the first direction; and
a transducer for sensing motion of the at least one proof-mass normal to the plane.

2. The gyroscope of claim 1 wherein the at least one proof-mass comprises at least two proof masses, the at least two proof-masses being coupled to at least one guiding arm, the at least one guiding arm being coupled to the substrate through at least one spring;
wherein the two proof masses move in anti-phase along the first direction;
wherein the at least one guiding arm and the two proof-masses are able to rotate out of the plane about the first sense axis in response to angular velocity about the first input axis that is in the plane.

3. The gyroscope of claim 2 which includes:
at least one other proof-mass coupled to the at least one proof mass, wherein when the at least one proof mass is vibrating the at least one other proof-mass rotates in plane; and
a second transducer for detecting the rotation of the at least one other proof-mass about a second sense axis orthogonal to the first sense axis responding to angular velocity about a second input axis that is in plane and orthogonal to the first input axis.

4. The gyroscope of claim 2 further comprising:
a stress relief frame, wherein the at least one guiding arm is flexibly coupled to the stress relief frame via the at least one spring, wherein the stress relief frame is coupled to the substrate, wherein the stress relief frame is not driven by the actuator; wherein the stress relief frame decouples motion of the substrate coupling points from the at least one spring to prevent stress on the at least one spring.

5. The gyroscope of claim 1 further comprising:
at least one other proof mass coupled to the at least one proof mass, wherein when the at least one proof mass is vibrating the at least one other proof mass vibrates; and
at least one other transducer for sensing motion of the at least one other proof-mass in response to angular velocity about an axis other than the first input axis.

6. The gyroscope of claim 1 which includes:
at least one other proof-mass coupled to the at least one proof mass, wherein when the at least one proof mass vibrates, the at least one other proof-mass translates in the first direction and in response to angular rotation of the gyroscope about a second input axis normal to the plane, the at least one other proof-mass translates in the plane orthogonal to the first direction; and
a second transducer for detecting motion of the at least one other proof-mass in the plane orthogonal to the first direction.

7. A gyroscope comprising;
a substrate;
a guided mass system, the guided mass system comprising a first proof-mass and at least one guiding arm; wherein the first proof-mass and the at least one guiding arm are disposed in a plane parallel to the substrate; the first proof-mass being coupled to the at least one guiding arm; the at least one guiding arm being coupled to the substrate through at least one spring; wherein the at least one guiding arm allows for motion of the first proof-mass in a first direction in the plane; wherein the at least one guiding arm and the first proof-mass are able to rotate out of the plane about a first sense axis, the first sense axis being in the plane and parallel to the first direction; a second proof-mass coupled to the first proof mass, wherein when first proof mass moves in the first direction, the second proof-mass rotates in plane;
a third proof-mass coupled to the first proof mass, wherein when the first proof mass moves in the first direction, the third proof-mass moves in the first direction, an actuator for vibrating the first proof-mass in the first direction;
a first transducer for sensing motion of the first proof-mass normal to the plane in response to angular velocity about a first input axis that is in the plane and orthogonal to the first direction;
a second transducer for detecting the rotation of the second proof-mass about a second sense axis orthogonal to the first sense axis responding to angular velocity about a second input axis that is in plane and orthogonal to the first input axis; and
a third transducer for detecting motion of the third proof-mass in-plane and orthogonal to the first direction in response to angular rotation of the gyroscope about a third input axis normal to the plane.

8. A gyroscope comprising:
a substrate;
a first guided mass system, the first guided mass system comprising at least one proof-mass and at least one guiding arm; wherein the at least one proof-mass and the at least one guiding arm are disposed parallel to the substrate; the at least one proof-mass being coupled to the at least one guiding arm; the at least one guiding arm being coupled to the substrate through at least one spring; wherein the proof-mass vibrates in a first direction and the guiding arm rotates in plane; wherein the at least one guiding arm and the at least one proof-mass rotate about a first sense axis in response to angular velocity about a first input axis that is in the plane and orthogonal to the first direction, the first sense axis being in-plane and parallel to the first direction;

a first spring;

a second guided mass system, the second guided mass system coupled by the first spring to the first guided mass system; the second guided mass system comprising at least one proof-mass and at least one guiding arm; wherein the at least one proof-mass and the at least one guiding arm are disposed parallel to the substrate; the at least one proof-mass being coupled to the at least one guiding arm; the at least one guiding arm being coupled to the substrate through at least one spring; wherein the proof-mass vibrates in a first direction and the guiding arm rotates in plane; wherein the at least one guiding arm and the at least one proof-mass rotate about a second sense axis in response to angular velocity about a first input axis that is in the plane and orthogonal to the first direction, the second sense axis being in-plane and parallel to the first direction;

wherein the first guided mass system rotates about the first axis in response to angular rate, the second guided mass system rotates about the second axis in response to angular rate, and the first and second guided mass systems rotate anti-phase in response to angular rate;

an actuator for vibrating each of the at least one proof-mass in the first direction; and a transducer for sensing at least one proof-mass motion normal to the substrate in response to angular velocity that is parallel to the substrate and orthogonal to the first direction.

9. The gyroscope of claim 8 further comprising:

a stress relief frame, wherein the at least one guiding arm is flexibly coupled to the stress relief frame via the at least one springs of the first and second guided mass systems, wherein the stress relief frame is coupled to the substrate, wherein the stress relief frame is not driven by the actuator; wherein the stress relief frame decouples motion of the substrate coupling points from the at least one spring to prevent stress on the at least one spring.

10. The gyroscope of claim 8 further comprising:

a second spring;

a third guided mass system, the third guided mass system coupled by the second spring to the first guided mass system; the third guided mass system comprising at least one proof-mass and at least one guiding arm; wherein the at least one proof-mass and the at least one guiding arm are disposed parallel to the substrate; the at least one proof-mass being coupled to the at least one guiding arm; the at least one guiding arm being coupled to the substrate through at least one spring; wherein the at least one guiding arm allows for motion of the at least one proof-mass to the first direction; wherein the at least one guiding arm and the at least one proof-mass rotate about a third sense axis, the third sense axis being in-plane and parallel to the first direction;

wherein the second guided mass system rotates about the first axis in response to angular rate, the third guided mass system rotates about the second axis in response to angular rate, and the second and third guided mass systems rotate anti-phase in response to angular rate.

11. The gyroscope of claim 10 further comprising:

a stress relief frame, wherein the at least one guiding arm is flexibly coupled to the stress relief frame via the at least one spring of the first, second and third guided mass systems, wherein the stress relief frame is coupled to the substrate, wherein the stress relief frame is not driven by the actuator; wherein the stress relief frame decouples motion of the substrate coupling points from the at least one spring to prevent stress on the at least one spring.

12. A gyroscope comprising;

a substrate;

a guided mass system, the guided mass system comprising at least two proof-masses and at least one guiding arm; wherein the at least two proof-masses and the at least one guiding arm are disposed in a plane parallel to the substrate; the at least two proof-masses being coupled to the at least one guiding arm; the at least one guiding arm being coupled to the substrate through at least one spring; wherein the at least one guiding arm allows for anti-phase motion of the at least two proof-masses along a first direction in the plane;

at least one other proof-mass coupled to the at least two proof masses, wherein when the at least two proof masses move anti-phase in the first direction the at least one other proof-mass rotates in plane; and an actuator for vibrating the at least two proof-masses antiphase in the first direction; and a transducer for detecting the rotation of the at least one other proof-mass about a sense axis in the plane and orthogonal to the first direction responding to angular velocity about an input axis that is in plane and parallel to the first direction.

* * * * *